Patented July 21, 1942

2,290,550

UNITED STATES PATENT OFFICE 2,290,550

METHOD OF SETTING COATING COMPOSITIONS

Albert E. Gessler, New York, and Clifford Jay Rolle, Yonkers, N. Y., assignors to Interchemical Corporation, New York, N. Y., a corporation of Ohio No Drawing. Application January 29, 1938, Serial No. 187,678

2 Claims. (Cl. 91—70)

This invention relates to a method of setting coating compositions containing urea formaldehyde resins, and more particularly to a new method by which light-colored coatings of this character may be set without discoloration.

Coating compositions containing urea formaldehyde resins contain also a solvent in which the resin is dissolved and a plasticizer to prevent brittleness. The setting of such coating compositions involves evaporation of the solvent and polymerization of the resin to the insoluble and infusible state. Such polymerization, we shall term "full polymerization" since, from a practical point of view, it is full polymerization whether or not the insoluble and infusible state which the resin acquires evidences absolutely completed ploymerization in a chemical sense. It has long been recognized that both of these operations are accelerated by heat. It is known, on the other hand, that excessive heat has a pronounced tendency to promote side reactions usually involving the plasticizer, which discolor light colored coating compositions by giving them a yellowish cast. In order to avoid discoloration, it has heretofore been customary to limit the drying temperature to 250° F. or a maximum 300° F., and to effect the setting of the composition by the long baking which is necessary in order to obtain full polymerization of the resin at such temperatures. A bake of from 30 minutes up to several hours is customary.

We have discovered that the urea formaldehyde resin in a film of coating composition may be fully polymerized, that is, brought to the insoluble and infusible state, practically instantaneously at a temperature of 400° F., and that discoloration may be prevented more effectively by limitation of the time of heating, than by limiting the temperature. Our method, which is based on this discovery, consists in setting a coating composition containing urea formaldehyde resins by rapidly heating the coating to a temperature at which full polymerization of the resin is practically instantaneous, and then cooling the coating composition before visual discoloration sets in. In this way, full polymerization is obtained without objectionable discoloration, and, at the same time, the production of coated articles is materially accelerated.

In the practical application of our method, we maintain in a drying oven a temperature of at least 400° F. and, most desirably, a considerably higher temperature. Articles coated with a urea formaldehyde coating composition are introduced into the oven and maintained therein until their coated surfaces reach a temperature of 400° F. and then removed from the oven and allowed to cool. The time during which coated articles are kept in the oven in this method depends upon the rapidity with which the coated surface of the article may be heated to a temperature at which full polymerization is practically instantaneous. Thus, when the coated article is standard furniture sheet steel (22 gauge), and the oven temperature is 400° F., the coated surface will reach that temperature in about two minutes unless a substantial amount of volatile solvent is present in the coating when the article is put in the oven. If, as is more desirable, the oven be maintained at 500° F., one minute in the oven is sufficient to raise the coated surface of standard furniture sheet steel to 400° F., while the same result is obtained in ten seconds if the oven is maintained at 1000° F. and in six seconds if the oven is maintained at 1500° F. The use of oven temperature of 1000° F. and above is highly desirable, since it so reduces the heating time required as to permit straight-line passage of the coated article through the oven.

When the coated article is of heavier material, longer exposure to various different oven temperatures is necessary to heat the coating to 400° F., than is the case when the coating is on relatively thin material. It is, however, a simple matter in carrying out our method to determine the time required to heat any given article to a temperature of 400° F.

Visible discoloration is avoided in our method by removing the coated article from the oven and allowing it to cool before side reactions set in, and preferably as soon as the film has reached the temperature at which practically instantaneous polymerization takes place.

In carrying out our method, it is important when ordinary solvents of the lacquer type are used, that the solvent contained in the coating or at least the greater part of it be eliminated before the article is introduced into the highly heated oven, as otherwise the solvent will evaporate so rapidly in the oven that it will leave the surface of the coating puckered. Furthermore, the evaporation of the solvent in the oven has the disadvantage of increasing the time required to heat the coating to full polymerization temperature. An important preliminary step in our method is the evaporation of the greater part of the solvent in the coating at a relatively low temperature. With ordinary solvents such as those mentioned in the example hereinafter given, sufficient evaporation may be secured by exposure of the coating at room temperature for a few minutes.

Because of the fact that we obtain substantially full polymerization of the resin, the finishes produced by our process are vitreous in appearance, and possess such hardness and excellent resistance to acids, weak alkalies, and other agents that they may be used to advantage as substitutes for vitreous enamel.

EXAMPLES

Typical examples of the finishes used are as follows:

EXAMPLE I.—*Clear coating solution*

| | Pounds |
|---|---|
| Urea resin solution | 35 |
| Alkyd resin solution | 35 |
| Toluol | 15 |
| Butanol | 15 |

The urea resin solution is made in known manner by reacting 2.34 mols of urea with 6 mols of paraformaldehyde in butanol, and distilling until at least 2.34 mols of water have been eliminated. The solution is then adjusted by adding butanol to produce a solution containing 50% of resin.

The alkyd resin is made by reacting 2450 pounds of castor oil, 600 pounds of glycerine, and 1 pound of litharge at 450° F. to produce a monoglyceride then adding 2000 pounds of phthalic anhydride and 250 pounds of glycerine and holding at 450° F. for several hours until the acid number is below 10. The resin is then cooled, and a 60% solution is made by reducing it with toluol.

EXAMPLE II.—*White enamel*

| | Pounds |
|---|---|
| Titanium dioxide | 12.5 |
| Urea resin solution of Example I | 40.0 |
| Alkyd resin solution of Example I | 40.0 |
| Toluol | 4.0 |
| Butanol | 3.5 |

EXAMPLE III

A fast drying white enamel with properties similar to the last may be made by replacing the alkyd resin solution of Example I with a similar alkyd resin utilizing soya bean oil in place of castor oil.

EXAMPLE IV

The urea resin solution of Example I was replaced with a thiourea resin solution prepared in a similar manner to the urea resin of Example I.

EXAMPLE V

The urea resin solution of Example II was replaced by a resin made by reacting 1 mol of urea with 3.6 mols of formaldehyde in aqueous solution in the presence of an acid catalyst, at a temperature of about 60° C. to 80° C. after heating has been continued for several hours, butanol is added and water distilled off to produce a solution of resin in butanol, which is then adjusted to 50% solid content.

As indicated in the examples, we prefer to use modified alkyd resins as the plasticizers for our urea resin finishes, because they give us minimum discoloration; but other plasticizers miscible with the urea resins and not volatile at 400° F. may be employed. While we have shown but a few examples, other changes in the compositions may obviously be made without departing from the scope of the invention.

The term "urea formaldehyde resin" as used herein embraces resins made from urea itself, from thiourea, substituted ureas, and urea derivatives, and from compounds such as cyanamide which react during resinification to form urea in situ.

What we claim is:

1. The method of producing a vitreous-like light colored finish on an article, which comprises applying to the article a coating composition containing a urea-formaldehyde resin soluble in organic solvents, a modified alkyd resin plasticizer therefor subject to discoloration on heating and a mutual solvent for the resins, and exposing the article carrying the film of coating composition to a temperature of at least 1000° F. for a period of time sufficient to harden the film but not over ten seconds.

2. The method of producing a vitreous-like light colored finish on an article, which comprises applying to the article a coating composition containing a urea-formaldehyde resin soluble in organic solvents, a fatty oil modified alkyd resin plasticizer therefor subject to discoloration on heating and a mutual solvent for the resins, and exposing the article carrying the film of coating composition to a temperature of at least 1000° F. for a period of time sufficient to harden the film but not over ten seconds.

ALBERT E. GESSLER.
CLIFFORD JAY ROLLE.